US012786924B2

(12) United States Patent
Nuggehalli et al.

(10) Patent No.: US 12,786,924 B2
(45) Date of Patent: Nov. 3, 2026

(54) MULTI-USIM DEVICE ACCESSING SERVICES OF A SECOND CELLULAR NETWORK THROUGH A FIRST CELLULAR NETWORK VIA A GATEWAY

(71) Applicant: Google LLC, Mountain View, CA (US)

(72) Inventors: Pavan Nuggehalli, Mountain View, CA (US); Shivank Nayak, Mountain View, CA (US); Jibing Wang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 537 days.

(21) Appl. No.: 18/011,497

(22) PCT Filed: May 5, 2021

(86) PCT No.: PCT/US2021/030796

§ 371 (c)(1),
(2) Date: Dec. 19, 2022

(87) PCT Pub. No.: WO2021/226181

PCT Pub. Date: Nov. 11, 2021

(65) Prior Publication Data

US 2023/0362862 A1 Nov. 9, 2023

Related U.S. Application Data

(60) Provisional application No. 63/021,594, filed on May 7, 2020.

(51) Int. Cl.
*H04W 60/00* (2009.01)
*H04W 8/18* (2009.01)
(Continued)

(52) U.S. Cl.
CPC ......... *H04W 60/005* (2013.01); *H04W 8/183* (2013.01); *H04W 48/18* (2013.01); *H04W 84/042* (2013.01)

(58) Field of Classification Search
CPC ... H04W 60/005; H04W 8/183; H04W 48/18; H04W 84/042; H04W 88/06
See application file for complete search history.

(56) References Cited

U.S. PATENT DOCUMENTS

2019/0021048 A1 1/2019 Kadiri et al.
2019/0098487 A1* 3/2019 Boettger ............... H04W 8/183
(Continued)

OTHER PUBLICATIONS

ETSI Technical Specification, 5G; Non-Access-Stratum (NAS) protocol for 5G System (5GS); Stage 3 (3GPP TS 24.501 version 15.0.0 Release 15) (Jul. 2018).
(Continued)

*Primary Examiner* — Marcus Hammonds
(74) *Attorney, Agent, or Firm* — Lowenstein Sandler LLP

(57) ABSTRACT

A user device (UE) equipped with a first universal subscriber identity module (USIM) for communicating with a first cellular network and a second USIM for communicating with a second cellular network, wherein the first cellular network includes a first radio access network (RAN) and the second cellular network includes a second RAN, determines whether the first cellular network supports access to a gateway of the second cellular network (402), and when the first cellular network supports the access: (i) connects to the second cellular network via the first RAN and the gateway (408), and (ii) prevents the second cellular network from transmitting information to the UE via the second RAN (410).

20 Claims, 6 Drawing Sheets

(51) Int. Cl.
*H04W 48/18* (2009.01)
*H04W 84/04* (2009.01)

(56) References Cited

U.S. PATENT DOCUMENTS

| | | | | |
|---|---|---|---|---|
| 2019/0306898 | A1 | 10/2019 | Goddetti et al. | |
| 2021/0314858 | A1* | 10/2021 | Wong | H04W 88/16 |
| 2022/0240213 | A1* | 7/2022 | Ly | H04W 60/02 |

OTHER PUBLICATIONS

PCT/US2021/030796, International Search Report and Written Opinion of the International Searching Authority dated Aug. 16, 2021.
LG Electronics: "Solution: MT Service notification for Musim UE," 3GPP Draft; S2-2000650, 3rd Generation Partnership Project (3GPP), Mobile Competence Entre, 650, Route Des Lucioles; F-06921, Sophia-Antipolis Cedex; France.
VIVO: "Solution for UE initiated leave and return a network for key issue#3", 3GPP Draft; S2-2000132, 3rd Generation Partnership Project (3GPP), Mobile Competence Centre; 650, Route Des Lucioles ; F-06921 Sophia-Antipolis Cedex; France.
Google: "FS Musim: KI#1, New sol: ePDG connectivity for MT service in Multi-USIM scenarios," 3GPP Draft; S2-2004233, 3rd Generation Partnership Project (3GPP), Mobile Competence Centre; 650, Route Des Lucioles; F-06921 Sophia-Antipolis Cedex; France.

* cited by examiner

MULTI-USIM DEVICE ACCESSING SERVICES OF A SECOND CELLULAR NETWORK THROUGH A FIRST CELLULAR NETWORK VIA A GATEWAY

CROSS REFERENCE TO RELATED APPLICATIONS

This application is claims priority to the PCT patent application PCT/US2021/030796 filed on May 5, 2021, and U.S. Provisional Application No. 63/021,594 filed May 7, 2020, the disclosures of which are hereby incorporated herein by reference in their entireties.

FIELD OF THE DISCLOSURE

This disclosure relates to wireless communications and, more particularly, to supporting packet-based voice and video calls through a gateway of a cellular network over certain radio access technologies.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A user device (commonly referred to as "user equipment" or "UE") can be equipped with multiple Universal Subscriber Identity Module (USIM) cards that can access services provided by respective cellular networks, which can correspond to different public land mobile networks (PLMNs) operated by different service providers. A UE thus for example can connect to a first PLMN via one USIM, and to a second PLMN via another USIM.

The first PLMN and the second PLMN can support the same technologies (e.g., Evolved Packet System (EPS) or Fifth-Generation System (5GS)) or different technologies (e.g., one can include an EPS and the other include a 5GS). The multi-USIM device (e.g., a dual-USIM device) can have a single receiver and a single transmitter, or a dual receiver and single transmitter. That is, a single receiver allows the multi-USIM device to receive traffic from one radio access network (RAN) of a PLMN at one time, whereas dual receivers allow the multi-USIM device to receive traffic from two RANs of two corresponding PLMNs simultaneously. The single transmitter allows the multi-USIM device to transmit traffic to only one RAN at any one time.

In some scenarios, the multi-USIM device, while communicating with the first PLMN associated with a first USIM, may also communicate with a second PLMN associated with a second USIM. For example, the multi-USIM device may receive and respond to page requests or incoming calls. Although the 3rd Generation Partnership Project (3GPP) document TR 23.761 proposes certain approaches to supporting communications between a multi-USIM device and two PLMNs, these approaches require that the multi-USIM device communicate with each PLMN over the respective radio interfaces, which can generate interruptions in service and/or require additional messaging.

SUMMARY

Generally speaking, a UE registered with first and second cellular networks using corresponding USIMs implements the techniques of this disclosure to connect to a second cellular network via the radio interface of the first cellular network and a gateway via which the core network of the first cellular network can access the second cellular network, without connecting to the second cellular network over a radio interface of the second cellular network. The gateway can be for example an evolved Packet Data Gateway (ePDG). In this manner, the UE can access services of the second cellular network while communicating with only the first cellular network via the radio interface. The first cellular network can set the parameters of the connection in accordance with Quality of Service (QoS) requirements of the services which the UE accesses at the second cellular network. For example, the first cellular network in some implementations can request that the second cellular network fulfill the QoS requirements associated with the Internet Protocol (IP) Multimedia Subsystem (IMS) voice.

In some implementations, the UE can query the first cellular network to determine whether the first cellular network supports access to the gateway of the second cellular network. The UE similarly can query the second cellular network to determine whether the second cellular network supports access to the gateway of the first cellular network. When both cellular networks support access to the corresponding gateways, the UE can choose the type of connection (e.g., the RAN of the first cellular network to the gateway of the second cellular network, or the RAN of the second first cellular network to the gateway of the first cellular network) based on one or more suitable criteria such as signal strength and/or quality for example.

The first and second cellular networks in some scenarios can be associated with different operators and different PLMNs. A cellular network with access to one or more ePDGs in various scenarios can indicate to the UE whether the cellular network supports ePDGs access to the same PLMN only, equivalent PLMNs only, a certain limited set of PLMNs, or all PLMNs.

After the UE selects the first cellular network that supports access to the gateway of the second cellular network, the UE can stop communicating with the second cellular network over the radio interface of the second cellular network. In particular, the UE need not monitor downlink transmissions from the second cellular network or attempt uplink transmissions to the second cellular network. In some cases, to prevent the second cellular network from unnecessarily expending resources to page the UE over the radio interface, for example, the UE can deregister (or detach) from the second cellular network, or activate Mobile Initiated Connection Only (MICO) mode, so that the core network does not page the UE.

One example implementation of these techniques is a method, in a UE equipped with a first USIM for communicating with a first cellular network and a second USIM for communicating with a second cellular network, wherein the first cellular network includes a first RAN and the second cellular network includes a second RAN. The method includes determining, by processing hardware of the UE, whether the first cellular network supports access to a gateway of the second cellular network. The method also includes, when the first cellular network supports the access: (i) connecting to the second cellular network via the first RAN and the gateway; and (ii) preventing the second cellular network from transmitting information to the UE via the second RAN. Another example implementation of these techniques is a UE with processing hardware configured to implement this method.

Another example implementation of these techniques is a method in a first cellular network including a first RAN for providing communication to a UE. The method includes transmitting, by processing hardware to the UE, an indication that the first cellular network supports access to a gateway of a second cellular network. The method also includes receiving, by the processing hardware from the UE, a request to access the second cellular network via the first RAN of the first cellular network. The method also includes establishing, by the processing hardware and in response to the request, a connection between the UE and the second cellular network, via the first RAN and the gateway. Another example implementation of these techniques is a cellular network with processing hardware configured to implement this method.

DETAILED DESCRIPTION OF THE DRAWINGS

Figure 1:
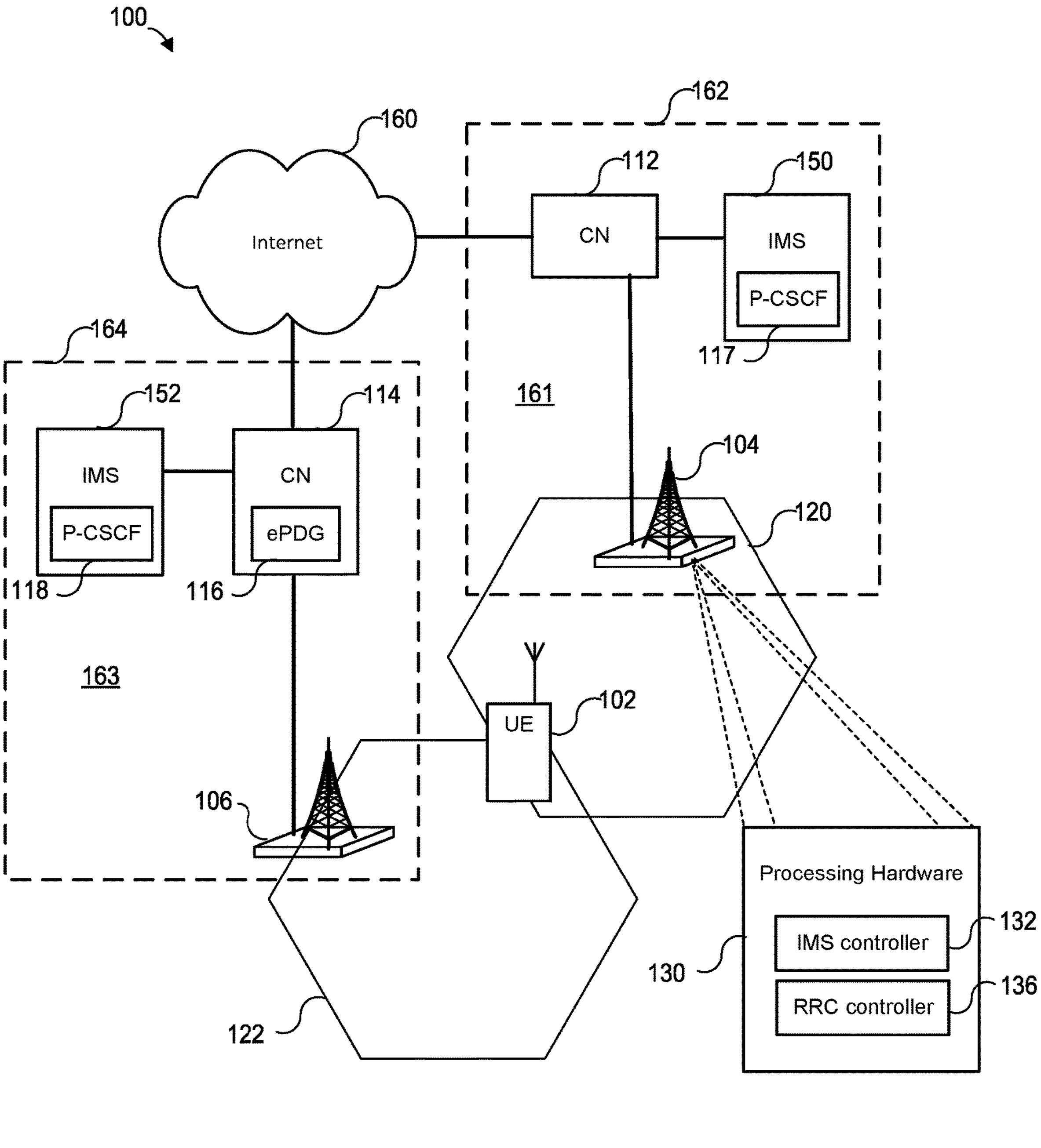
FIG. 1 is a block diagram of an example wireless communication network in which a user device (UE) connected to a PLMN can support an IP Multimedia Subsystem (IMS) call originated or terminated at the UE via an ePDG of another PLMN.

FIG. 1 depicts an example wireless communication network 100 in which a user device in various scenarios can be configured to support packet-based audio and video calls over certain RATs and core networks (CNs).

The examples below refer primarily to IMS video calls or IMS voice calls performed over NR or EUTRA RATs, with the corresponding base stations connected to 5GC or EPC core networks. In general, however, the techniques of this disclosure also can apply to other types of IP services, such as non-voice services (e.g., short message service (SMS)), other RATs, and other core networks.

Referring to FIG. 1, the UE 102 can be any suitable device capable of wireless communications (as further discussed below). In general, the wireless communication network 100 can include any number of base stations, and each of the base stations can cover one, two, three, or any other suitable number of cells. As illustrated, the wireless communication network 100 includes a base station 104 connected to a first core network (CN) 112, and a base station 106 connected to a second CN 114. The base station 104 and the first CN 112, or collectively referred to as a first cellular network 162, can be associated to a PLMN, e.g., PLMN 161, and similarly, the base station 106 and the second CN 114, or collectively referred to as a second cellular network 164, can be associated to a second PLMN, e.g., PLMN 163. Each of the PLMN 161 and the PLMN 163 may be an EPS or a 5GS. As such, each of the first CN 112 and the second CN 114 can be an evolved packet core (EPC) or a fifth-generation core (5GC). PLMNs 161 and 163 can be the same PLMNs, equivalent PLMNs (E-PLMNs), or different PLMNs.

Further, each of the base station 104 and base station 106 can operate as a EUTRA base station (e.g., an evolved Node B (eNB)) in implementations where the corresponding CN is an EPC or, in those implementations where the corresponding CN is a 5GC, as a next-generation eNB (ng-eNB) or a next-generation Node B (gNB). The base station 104 covers a cell 120, and the base station 106 covers a cell 122. The UE 102 can support EUTRA and 5G NR (or simply, "NW") air interfaces to exchange messages with each of the base stations 104 and 106, accordingly.

Among other components, the EPC can include a Serving Gateway (S-GW), a Mobility Management Entity (MME), and a Policy and Charging Rules Function (PCRF). The S-GW is generally configured to transfer user-plane packets related to audio calls, video calls, Internet traffic, etc., the MME is configured to manage authentication, registration, paging, and other related functions, and the PCRF supports service data flow detection, policy enforcement, and flow-based charging. The 5GC can include a User Plane Function (UPF), an Access and Mobility Management (AMF), a Session Management Function (SMF), and/or Policy Control Function (PCF). The UPF is generally configured to transfer user-plane packets related to audio calls, video calls, Internet traffic, etc., the AMF is configured to manage authentication, registration, paging, and other related functions, the SMF is configured to manage protocol data unit (PDU) sessions, and the PCF is configured to provide policies for mobility and session management. The AMF, SMF, and PCF, although not shown in FIG. 1 to avoid clutter, will be shown in FIGS. 3A and 3B.

In some implementations, in contrast to "3GPP access" technologies (e.g., base stations 104, 106) for interconnecting the UE 102 to the first CN 112 and/or the second CN 114, the EPS and 5GS may allow "non-3GPP access" technologies (e.g., WiMAX, WLAN) to interconnect the UE 102 and the EPC and 5GC, respectively. Non-3GPP access technologies can be split into two categories: the so-called "trusted" non-3GPP access and the "untrusted" non-3GPP access. Trusted non-3GPP access can interact directly with the CN, while untrusted non-3GPP access interact with the CN via a gateway, such as the ePDG. As such, in some implementations, the first CN 112 and/or the second CN 114 may include an ePDG, one of which is illustrated in FIG. 1 as ePDG 116 included in the second CN 114.

In some implementations, the first CN 112 and the second CN 114 can be connected to an IMS 150 and IMS 152, respectively. The IMS 150 may belong to the first cellular network 162, and IMS 152 may belong to the second cellular network 164. Depending on the implementation, the IMS 150 and the IMS 152 may be the same IMS or different instances of an IMS, and can support the Session Initiation Protocol (SIP) and the Internet Protocol (IP). In any case, the IMS 150 includes a Proxy Call Session Control Function (P-CSCF) module 117, and the IMS 152 includes a P-CSCF module 118. UEs such as the UE 102 can exchange messages with the P-CSCF module 117 or 118 during a registration procedure with the IMS. In addition to a P-CSCF module, the IMS 150 or 152 can include an Interrogating CSCF (I-CSCF) server, a Home Subscriber (HSS) server, and a Serving CSCF (C-CSCF) module (none shown to avoid clutter).

Each of the first CN 112 and the second CN 114 can also be connected to the Internet 160 (e.g., via an Internet access point name (APN)). In one implementation, the UE 102 can first connect to the first cellular network 162 via 3GPP access (e.g., via the base station 104), and register with the IMS 150 for IMS services of the first cellular network 162, e.g., using an IMS APN. The UE 102 can then establish a context (e.g., a packet data protocol (PDP) context) for connections via the base station 104 to connect to the Internet 160, e.g., via an Internet APN. Through a tunneled connection (e.g., a data connection) over the Internet 160 that traverses the base station 104 and the first CN 112, the UE 102 can connect to IMS 152 via ePDG 116 in the second CN 114. The UE 102 can register for access to IMS services of the second CN 114 and need not connect to the second cellular network 164 via 3GPP access (e.g., via the base station 106). That is, the UE 102 can connect to the IMS 152 of the second cellular network 164 bypassing its 3GPP access. The UE 102 can originate voice connections or text messaging and/or receive voice connections or text messaging using IMS services of the second cellular network 164 through the connection established with the first cellular network 162 via the base station 104. With the UE 102 registered or otherwise attached to both the first cellular network 162 and the second cellular network 164 (via a connection through the first cellular network 162), the UE 102 can access IMS services of both the first cellular network 162 and the second cellular network 164 simultaneously.

With continued reference to FIG. 1, the base station 104 is equipped with processing hardware 130 that can include one or more general-purpose processors (e.g., CPUs) and a non-transitory computer-readable memory storing instructions that the one or more general-purpose processors execute. Additionally or alternatively, the processing hardware 130 can include special-purpose processing units. The processing hardware in an example implementation includes an IMS controller 132 configured to support IMS calls of certain types and for certain RATs/CN types with user devices operating in the cell 120, including the UE 102, and a radio resource control (RRC) controller 136 to implement procedures and messaging at the RRC sublayer of the protocol communication stack.

The base station 106 may include generally similar components with the IMS controller of the base station 106 configured to support IMS calls with user devices operating in the cell 122.

Figure 2:
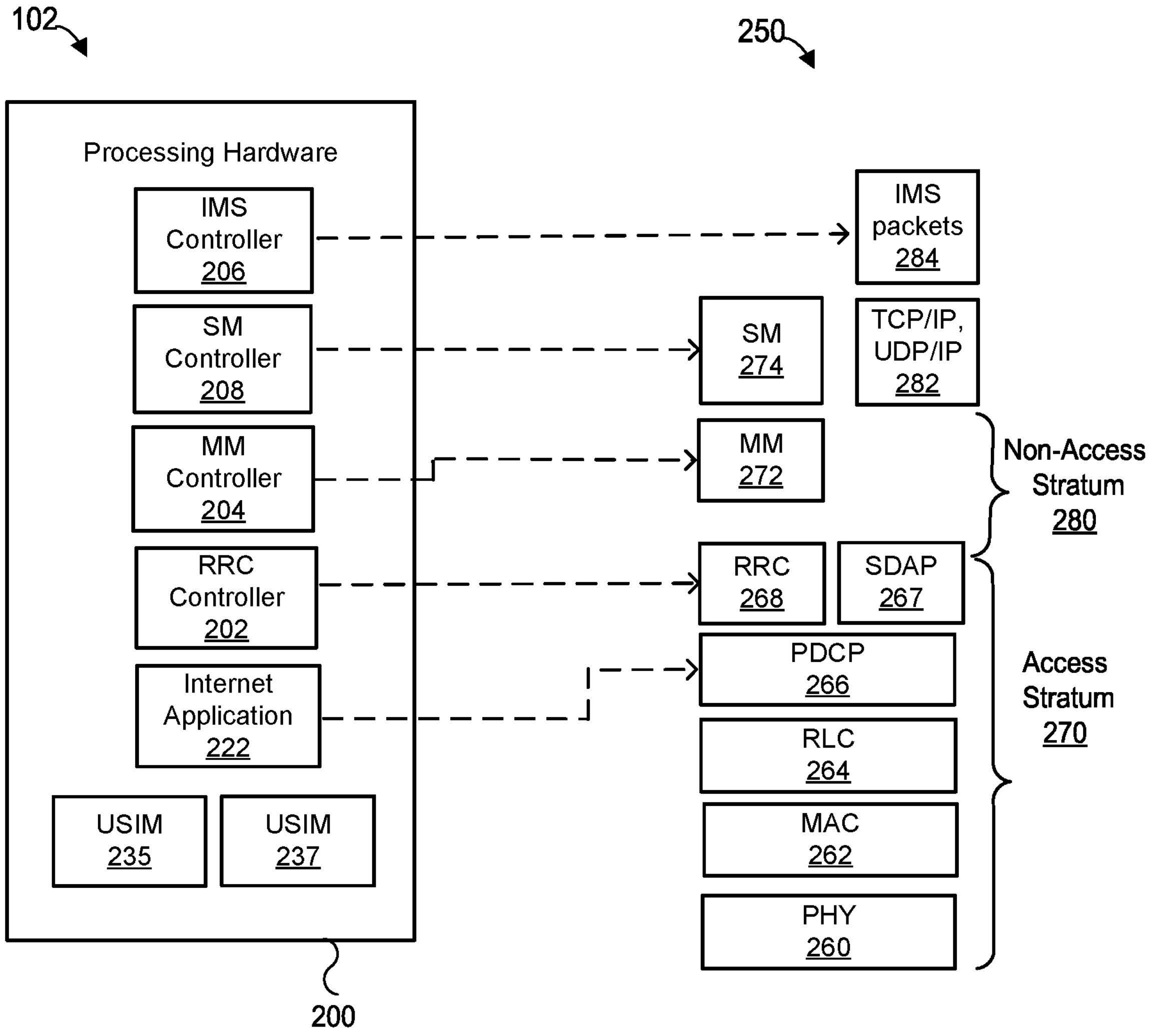
FIG. 2 illustrates example processing hardware of the UE of FIG. 1.

Next, FIG. 2 depicts various components of the UE 102. In particular, the UE 102 can be equipped with processing hardware 200 including one or more general-purpose processors (e.g., CPUs) and a non-transitory computer-readable memory storing instructions that the one or more general-purpose processors execute. Additionally or alternatively, the processing hardware 200 can include special-purpose processing units.

The processing hardware 200 includes USIM 235 and USIM 237. As used herein, the term "USIM" can refer to a universal subscriber identity module (USIM), a SIM, an electronic SIM (eSIM), a universal integrated circuit card (UICC), an embedded UICC (eUICC), or other suitable removable or embedded smart card, which includes any software, hardware, firmware, or combination thereof, to access services associated with a PLMN. For example, the USIM 235 and the USIM 237 can be used by the UE 102 to communicate with the first cellular network 162 and the second cellular network 164, respectively. The processing hardware 200 also includes an RRC controller 202, a mobility management (MM) controller 204, an IMS controller 206, and a Session Management (SM) controller 208. Each of the controllers 202, 204, 206, and 208 is responsible for inbound messaging, outbound messaging, and internal procedures at the corresponding layer of a protocol stack 250. In addition to supporting messaging external to the UE 102, the controllers 202, 204, 206, and 208 can exchange internal messages with each other as well as with other components of the UE 102, such as an Internet application 222, for example. Each of the controllers 202, 204, 206, and 208 can be implemented using any suitable combination of hardware, software, and firmware. In one example implementation, the controllers 202, 204, 206, and 208 are sets of instructions that define respective components of the operating system of the UE 102, and one or more CPUs execute these instructions to perform the corresponding functions. In another implementation, some or all of the controllers 202, 204, 206, and 208 are implemented using firmware as a part of a wireless communication chipset.

The protocol stack 250 includes a physical layer 260 (commonly abbreviated as PHY), a medium access control (MAC) layer 262, a radio link control (RLC) layer 264, a packet data convergence protocol (PDCP) sublayer 266, a service data adaption protocol (SDAP) sublayer 267, and the RRC sublayer 268 as part of the access stratum 270. These layers are ordered as illustrated in FIG. 2. The non-access stratum (NAS) 280 of the protocol stack 250 includes, among other sub-layers, an MM sublayer 272 for exchanging messages related to registration/attachment and location updates, for example, and an SM sublayer 274 for exchanging messages related to PDU session establishment, PDU session modification, PDU session authentication, and PDU session release, for example. The MM sublayer 272 can correspond to an Evolved MM (EMM) sublayer for EPS NAS procedures and a 5G MM (5GMM) sublayer for 5GS NAS procedures. The protocol stack 250 also can support higher-layer protocols for various services and applications, including for example TCP/IP and UDP/IP layer 282 and a set 284 of protocols for packet-based voice and/or packet-based video. The controllers 202, 204, 206, 208 generate outbound messages and process inbound messages corresponding to the layers or sublayers 268, 272, 284, 274, respectively, as schematically illustrated in FIG. 2. The controllers 202, 204, 206, 208 also carry out procedures internal to the UE 102.

Next, example scenarios that involve several components of FIG. 1 and related to IMS calls (e.g., IMS voice calls, IMS video calls) are discussed next with reference to FIGS. 3A-3B. The IMS call can be a mobile-originated (MO) call or a mobile-terminated (MT) call. Generally, UE 102 can connect to a first CN (e.g., first CN 112) and establish connectivity to an IMS (e.g., IMS 152) of a second CN (e.g., second CN 114) via an ePDG (e.g., ePDG 116) of the second CN. The UE 102, the base station 104, and the CNs 112, 114 can implement at least some of the steps of these scenarios in software, firmware, hardware, or any suitable combination of software, firmware, and hardware. Although FIGS. 3A-3B are discussed below with reference to these components depicted in FIG. 1, in general any suitable user device or groups of devices can implement these methods and scenarios.

Figure 3A:
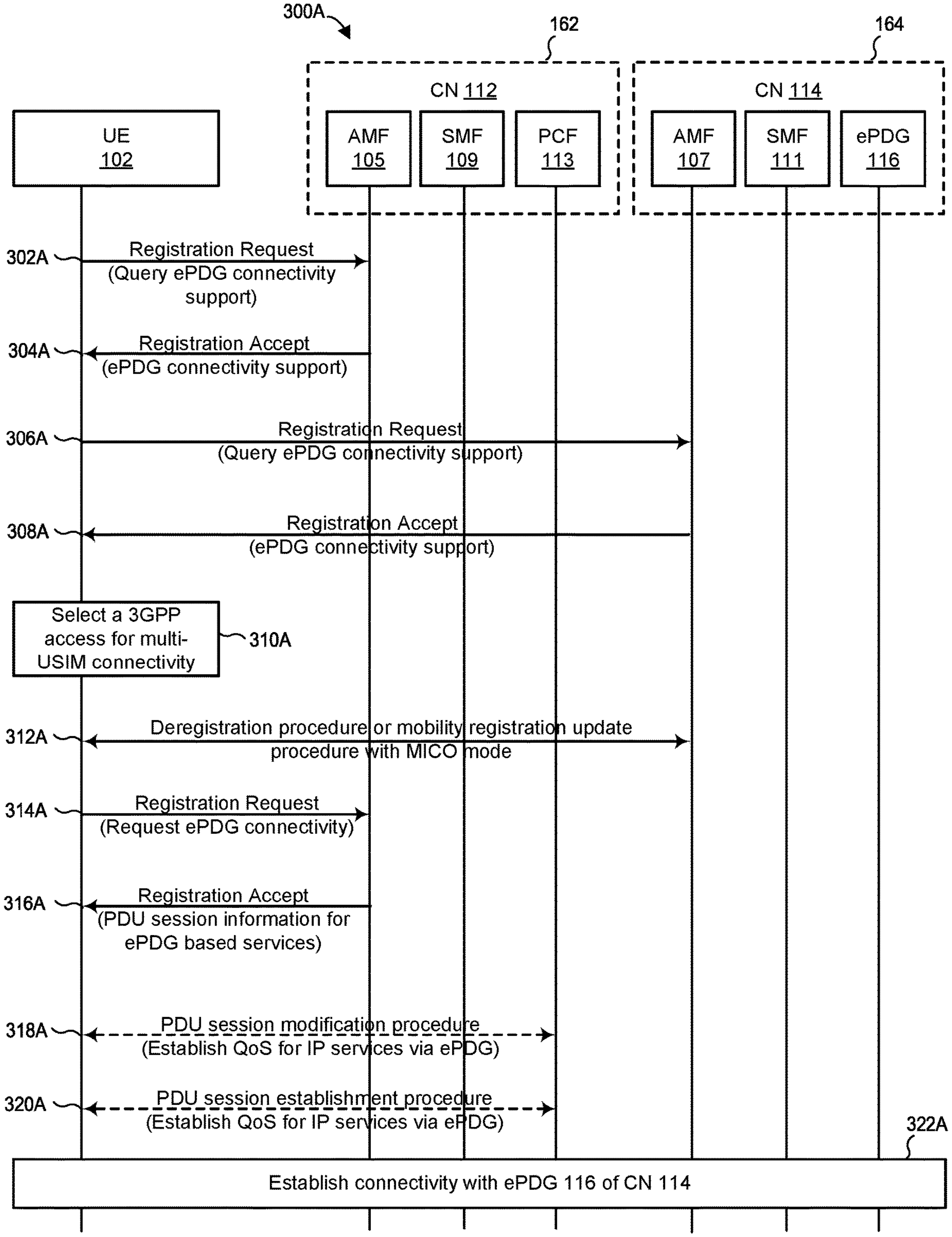
FIG. 3A is a messaging diagram of an example scenario in which a 5GS provides the UE of FIG. 1 a connection to another 5GS for accessing its services.
Figure 3B:
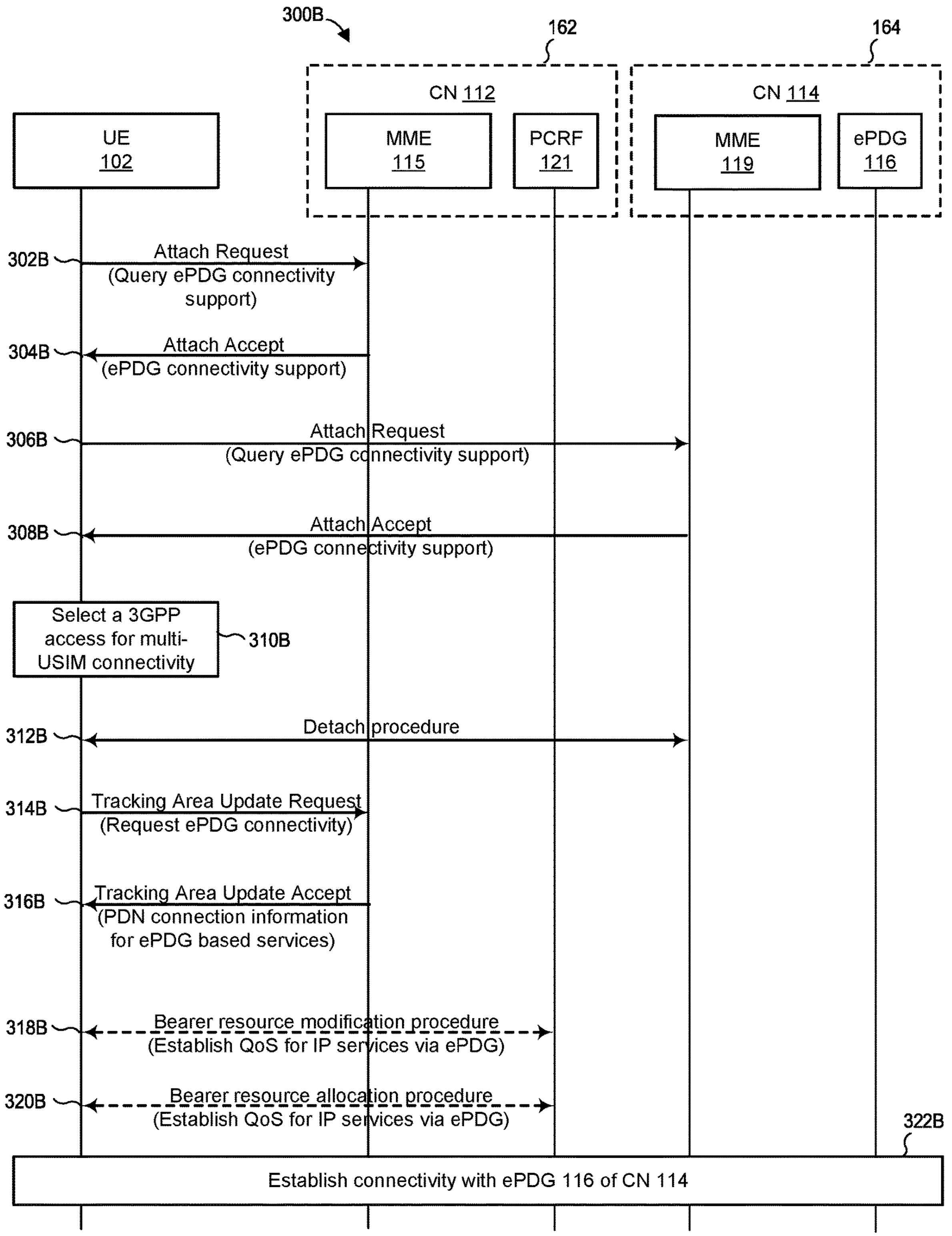
FIG. 3B is a messaging diagram of an example scenario in which an EPS provides the UE of FIG. 1 a connection to another EPS for accessing its services.

Referring to FIG. 3A, in a scenario 300A, the first CN 112 and the second CN 114, which belong to the first cellular network 162 and the second cellular network 164, respectively, are both 5GC. The first cellular network 162 can be associated to PLMN 161, and the second cellular network 164 can be associated to PLMN 163. The UE 102 initially has not yet registered with either of the first cellular network 162 or the second cellular network 164, and is generally unaware whether the first cellular network 162 supports ePDG connectivity (e.g., whether the first cellular network 162 supports connectivity to the ePDG of the second cellular network 164). Similarly, the UE 102 is unaware whether the second cellular network 164 supports ePDG connectivity (e.g., whether the second cellular network 164 supports connectivity to the ePDG of the first cellular network 162). For instance, unknown to the UE 102, PLMN 161 and PLMN 163 may have a roaming arrangement in which the second cellular network 164 allows user devices, such as UE 102, to access its IP services (e.g., IMS 152) via an ePDG (e.g., ePDG 116) of the second cellular network 164 through a connection that traverses the first cellular network 162.

To determine whether the first cellular network 162 supports ePDG connectivity, the UE 102 can query the first cellular network 162 by sending 302A a request (e.g., a mobility management request message) to the first CN 112 (e.g., AMF 105) via base station 104 to query whether the first cellular network 162 supports ePDG connectivity. In response, the first cellular network 162, by way of the first CN 112 (e.g., AMF 105), sends 304A a response (e.g., a mobility management response message) to the UE 102 via base station 104 that includes an indication that specifies whether the first cellular network 162 supports ePDG connectivity. The indication can specify that the first cellular network 162 supports an ePDG that belongs to or is otherwise associated with one or more PLMNs that the first cellular network 162 can access via a respective gateway. For example, if the indication specifies the same PLMN as the first cellular network 162 (e.g., PLMN 161), and PLMN 161 and PLMN 163 are the same PLMNs, the UE 102 can determine that the first cellular network 162 supports an ePDG that belongs to the second cellular network 164 associated with PLMN 163. As another example, if the indication specifies a listing of equivalent PLMNs (E-PLMNs), or all PLMNs that the first cellular network 162 can access, and PLMN 163 is included in either listing, the UE 102 can determine that the first cellular network 162 supports an ePDG that belongs to the second cellular network 164 associated with PLMN 163. Similarly, to determine whether the second cellular network 164 supports ePDG connectivity, the UE 102 can query the second cellular network 164 by sending 306A a request (e.g., a mobility management request message) to the second CN 114 (e.g., AMF 107) via base station 106 to query whether the second cellular network 164 supports ePDG connectivity. In response, the second cellular network 164, by way of the second CN 114 (e.g., AMF 107), sends 308A a response (e.g., a mobility management response message) to the UE 102 via base station 106 that includes an indication that specifies whether the second cellular network 164 supports ePDG connectivity. The mobility management request message and the mobility management response message discussed above, which can be exchanged at the MM sublayer 272, can be a Registration Request message and a Registration Accept message pursuant to the 5GS NAS Registration procedure specified in 3GPP TS 24.501, for example, with new indications for designating the ePDG connectivity support query and ePDG connectivity support response.

In other implementations, rather than utilizing the 5GS NAS Registration procedure, each of the base stations 104, 106 of the respective first cellular network 162 and the second cellular network 164 can provide, to the UE 102, an indication of whether ePDG connectivity is supported. The indication can be broadcasted in a system information block (SIB) to the UE 102 at the RRC sublayer 268, in the corresponding cells 120, 122, for example.

After receiving indication(s) from the first cellular network 162 and/or the second cellular network 164 that specify whether the first cellular network 162 and/or the second cellular network 164 supports ePDG connectivity, the UE 102 can determine 310A to which CN to connect via 3GPP access, and select the CN that supports ePDG connectivity, e.g., as determined from the Registration Accept message or the SIB. For example, if the UE 102 becomes aware that the first CN 112 can reach the second CN 114 via ePDG 116 of the second CN 114, but the second CN 114 cannot reach the first CN 112 via ePDG of the first CN 112, the UE 102 selects 310A 3GPP access of the first cellular network 162 for multi-USIM connectivity, that is, to connect to the first cellular network 162 and to the second cellular network 164 via ePDG 116. If the first CN 112 and the second CN 114 support cross-connectivity via ePDG (i.e., the first CN 112 can reach the second CN 114 via ePDG 116 of the second CN 114, and the second CN 114 can reach the first CN 112 via ePDG of the first CN 112), the UE 102 can select one of the first CN 112 or the second CN 114 based on one or more criteria, which may include a preference of the UE 102, or a suitable wireless connectivity parameter. For example, the UE 102 can perform measurements to obtain a signal strength parameter (e.g., Reference Signal Received Power (RSRP), Reference Signal Received Quality (RSRQ)) between the UE 102 and each of the base stations 104, 106, and select the CN corresponding to the base station that exhibits a higher RSRP or RSRQ.

After the UE 102 selects one of the CNs (e.g., the first CN 112) to connect via its corresponding 3GPP access, the UE 102 need not monitor the non-selected CN (e.g., the second CN 114) via its corresponding 3GPP access. That is, the UE 102 need not monitor downlink transmissions from the second cellular network 164 or attempt uplink transmissions to the second cellular network 164. To prevent the second cellular network 164 from unnecessarily expending resources to page the UE 102 via its corresponding 3GPP access, or otherwise incorrectly determining that the UE 102 is unreachable, the UE 102 deregisters 312A from the second cellular network 164 so that the second CN 114 of the second cellular network 164 does not page the UE 102. In some implementations, the UE 102 can deregister from the second cellular network 164 by performing a Deregistration procedure pursuant to 3GPP TS 23.502 with the second CN 114 (e.g., AMF 107) via the base station 106. Alternatively, the UE 102 can activate Mobile Initiated Connection Only (MICO) mode using a Mobility Registration Update procedure pursuant to 3GPP TS 24.501 with respect to the second cellular network 164. More generally, either procedure can include any suitable messaging and processing at the UE 102 and/or the second cellular network 164 that causes the UE 102 to prevent the second cellular network 164 from transmitting information (e.g., paging messages) to the UE 102 via its RAN (e.g., base station 106). In some implementations, in either procedure, the UE 102 can provide a new information element (IE) or suitable indicator to the second cellular network 164, indicating that the UE 102 prefers to connect to the second cellular network 164 via ePDG 116.

After the UE 102 selects one of the CNs (e.g., the first CN 112), the UE 102 connects to the first CN 112 of the first cellular network 162 via 3GPP access. For example, the MM controller 204 or another suitable entity in the UE 102 can perform the Mobility Registration Update procedure pursuant to 3GPP TS 24.501 to connect to the first cellular network 162. In the example configuration of FIGS. 1 and 2, the MM controller 204 of the UE 102 can transmit 314A a request to the first CN 112 (e.g., AMF 105) via the cell 120. The request can be associated with mobility management at a NAS layer 280, and more particularly, the MM sublayer 272, such as the Registration Request message as discussed above. In some implementations, the UE 102 can include an indication in the request at event 314A when performing the Mobility Registration Update procedure to specify that the UE 102 intends to initially connect to the first CN 112 of the first cellular network 162 via 3GPP access to reach the ePDG 116 of the second cellular network 164. In this way, the first cellular network 162 can be put on notice that the UE 102 is requesting to use its RAN and core network resources to connect to the second cellular network 164, and exercise control over granting whether the UE 102 successfully connects to the ePDG 116. If the first cellular network 162 grants such ePDG connectivity, the UE 102 subsequently connects to the second cellular network 164 (via the ePDG 116 of the second CN 114) through a connection that traverses the first cellular network 162 to access IP services offered by the second CN 114.

In some implementations, the UE 102 can optionally provide to the first CN 112 (e.g., SMF 109, PCF 113) QoS requirements of the IP services intended to be established with the ePDG 116. For example, to convey the needs of the requested IP service, the UE 102 can include a QoS profile (e.g., standardized 5G QoS Identifier (5QI) value(s) or QoS Class Identifiers (QCI) value(s) because different types of user plane payload may correspond to different values) of the intended IP service(s), or an identification of the intended IP service(s) in the request at event 314A, or otherwise provide such QoS requirements during the Mobility Registration Update Procedure discussed above.

In response to receiving the request, the first CN 112 (e.g., AMF 105) transmits 316A a response (e.g., Registration Accept message) to the MM controller 204 of the UE 102 via the cell 120. The response can include information to instruct the UE 102 to either establish a new PDU session associated with a protocol for exchanging data packets between the UE 102 and the second cellular network 164 via the ePDG 116, or to use an existing PDU session associated with a protocol for exchanging data packets between the UE 102 and the second cellular network 164 via the ePDG 116. For example, if the first CN 112 determines that an existing PDU session between the second cellular network 164 and the UE 102 is sufficient to handle the QoS requirements of the IP services requested by the UE 102, the first CN 112 may include an indication in the Registration Accept message to instruct the UE 102 to reuse the existing PDU session. Otherwise, the first CN 112 may include an indication in the Registration Accept message to instruct the UE 102 to request a new PDU session, or to modify the existing PDU session.

In some implementations, if the UE 102 provides the first CN 112 with QoS requirements of the IP services intended to be established with the ePDG 116 discussed above, either the UE 102 or the first cellular network 162 can initiate a PDU session (either a modified existing PDU session or a new PDU session) with parameters that satisfy the QoS requirements. In this way, the quality of the connection that traverses the first cellular network 162 and the second cellular network 164 via the ePDG 116 is bolstered in accordance with the QoS requirements, so that IP services, such as IMS voice that typically has stringent QoS requirements, is properly supported over the connection. In some implementations, the first cellular network 162 can initiate the PDU session with QoS requirements based on a service level agreement (SLA) between the PLMN 161 and the PLMN 163, which may be the same or differ from the QoS requirements of the IP services intended to be accessed by the UE 102.

To modify an existing PDU session between the UE 102 and the second cellular network 164 via the ePDG 116, the UE 102 (e.g., SM controller 208) or the first CN 112 (e.g., SMF 109, PCF 113) can initiate 318A a PDU session modification procedure pursuant to 3GPP TS 23.502 to support the IP services to be delivered via ePDG 116. To established a new PDU session, the UE 102 (e.g., SM controller 208) can initiate 320A a PDU session establishment procedure pursuant to 3GPP TS 23.502 to establish a new PDU session with the first CN 112 (e.g., SMF 109, PCF 113). In some implementations, in either of these procedures, the UE 102 (e.g., SM controller 208) can transmit a PDU session request message (e.g., PDU Session Modification Request message, PDU Session Establishment Request message) to the first CN 112, which in turn modifies or otherwise establishes resources requested by the UE 102. More generally, either procedure can include any suitable messaging and processing at the UE 102 and/or the first CN 112 that causes the first CN 112 to establish a PDU session over ePDG 116 that satisfies QoS requirements for IP services accessible by the UE 102. The base station 104 then can transmit an RRC Configuration message configuring a data radio bearer (DRB) for the PDU session to the UE 102.

After successfully performing the PDU session establishment procedure and/or PDU session modification procedure, the UE 102 establishes 322A connectivity with the ePDG 116 of the second CN 114 via 3GPP access of the first CN 112. As a result, the base station 104 can generate a DRB configuration configuring DRB(s) and configure radio resources so that the UE 102 can transmit and receive packets of an IMS call (e.g., via Internet application 222). After configuring the radio resources, the UE 102 (e.g., IMS controller 206) can transmit IMS signaling messages (e.g., SIP messages) with the IMS 152 (e.g., P-CSCF 118) via the second CN 114 using the established PDU session, and receive the SIP "200 OK" message from the IMS 152 in response, thereby establishing an IMS call via the base station 104.

Referring to FIG. 3B, in a scenario 300B, the first CN 112 and the second CN 114, which belong to the first cellular network 162 and the second cellular network 164, respectively, are both EPC. Like in scenario 300A, the first cellular network 162 can be associated to PLMN 161, and the second cellular network 164 can be associated to PLMN 163. The UE 102 initially has not yet attached with either of the first cellular network 162 or the second cellular network 164, and is generally unaware whether either of the first cellular network 162 or the second cellular network 164 supports ePDG connectivity, similar to the scenario 300A. For instance, unknown to the UE 102, PLMN 161 and PLMN 163 may have a roaming arrangement in which the second cellular network 164 allows user devices, such as UE 102, to access its IP services (e.g., IMS 152) via an ePDG (e.g., ePDG 116) of the second cellular network 164 through a connection that traverses the first cellular network 162.

To determine whether the first cellular network 162 supports ePDG connectivity, the UE 102 can query the first cellular network 162 by sending 302B a request (e.g., a mobility management request message) to the first CN 112 (e.g., MME 115) via base station 104 to query whether the first cellular network 162 supports ePDG connectivity. In response, the first cellular network 162, by way of the first CN 112 (e.g., MME 115), sends 304B a response (e.g., a mobility management response message) to the UE 102 via base station 104 that includes an indication that specifies whether the first cellular network 162 supports ePDG connectivity. The indication can be similar to the indication described above in scenario 300A. Similarly, to determine whether the second cellular network 164 supports ePDG connectivity, the UE 102 can query the second cellular network 164 by sending 306B a request (e.g., a mobility management request message) to the second CN 114 (e.g., MME 119) via base station 106 to query whether the second cellular network 164 supports ePDG connectivity. In response, the second cellular network 164, by way of the second CN 114 (e.g., MME 119), sends 308B a response (e.g., a mobility management response message) to the UE 102 via base station 106 that includes an indication that specifies whether the second cellular network 164 supports ePDG connectivity. The mobility management request message and the mobility management response message discussed above, which can be exchanged at the MM sublayer 272, can be an Attach Request message and an Attach Accept message pursuant to the Attach procedure specified in 3GPP TS 24.301, for example, with new indications for designating the ePDG connectivity support query and ePDG connectivity support response.

In other implementations, rather than utilizing the Attach procedure, each of the base stations 104, 106 of the respective first cellular network 162 and the second cellular network 164 can provide, to the UE 102, an indication of whether ePDG connectivity is supported. The indication can be broadcasted in a SIB to the UE 102 at the RRC sublayer 268, in the corresponding cells 120, 122, for example.

After receiving indication(s) from the first cellular network 162 and/or the second cellular network 164 that specify whether the first cellular network 162 and/or the second cellular network 164 supports ePDG connectivity, the UE 102 can determine 310B to which CN to connect via 3GPP access, and select the CN that supports ePDG connectivity, e.g., as determined from the Attach Accept message or the SIB. For example, if the UE 102 becomes aware that the first CN 112 can reach the second CN 114 via ePDG 116 of the second CN 114, but the second CN 114 cannot reach the first CN 112 via ePDG of the first CN 112, the UE 102 selects 310B 3GPP access of the first cellular network 162 for multi-USIM connectivity, that is, to connect to the first cellular network 162 and to the second cellular network 164 via ePDG 116. If the first CN 112 and the second CN 114 support cross-connectivity via ePDG (i.e., the first CN 112 can reach the second CN 114 via ePDG 116 of the second CN 114, and the second CN 114 can reach the first CN 112 via ePDG of the first CN 112), the UE 102 can select one of the first CN 112 or the second CN 114 based on one or more criteria, which may include a preference of the UE 102, or a suitable wireless connectivity parameter described above with respect to scenario 300A.

After the UE 102 selects one of the CNs (e.g., the first CN 112) to connect via its corresponding 3GPP access, the UE 102 need not monitor the non-selected CN (e.g., the second CN 114) via its corresponding 3GPP access. To prevent the second cellular network 164 from unnecessarily expending resources to page the UE 102 via its corresponding 3GPP access, or otherwise incorrectly determining that the UE 102 is unreachable, the UE 102 deregisters 312B from the second cellular network 164 so that the second CN 114 of the second cellular network 164 does not page the UE 102. In some implementations, the UE 102 can deregister from the second cellular network 164 by performing a Detach procedure pursuant to 3GPP TS 24.301 with the second CN 114 (e.g., MME 119) via the base station 106. More generally, this procedure can include any suitable messaging and processing at the UE 102 and/or the second cellular network 164 that causes the UE 102 to prevent the second cellular network 164 from transmitting information (e.g., paging messages) to the UE 102 via its RAN (e.g., base station 106). In some implementations, in this procedure, the UE 102 can provide a new IE or suitable indicator to the second cellular network 164, indicating that the UE 102 prefers to connect to the second cellular network 164 via ePDG 116.

After the UE 102 selects one of the CNs (e.g., the first CN 112), the UE 102 connects to the first CN 112 of the first cellular network 162 via 3GPP access. For example, the MM controller 204 or another suitable entity in the UE 102 can perform a Tracking Area Update procedure pursuant to 3GPP TS 24.301, or alternatively, the Attach procedure described above to connect to the first cellular network 162. In the example configuration of FIGS. 1 and 2, the MM controller 204 of the UE 102 can transmit 314B a request to the first CN 112 (e.g., MME 115) via the cell 120. The request can be associated with mobility management at a NAS layer 280, and more particularly, the MM sublayer 272, such as the Tracking Area Update Request message. In some implementations, the UE 102 can include an indication in the request at event 314B to specify that the UE 102 intends to initially connect to the first CN 112 of the first cellular network 162 via 3GPP access to reach the ePDG 116 of the second cellular network 164. In this way, the first cellular network 162 can be put on notice that the UE 102 is requesting to use its RAN and core network resources to connect to the second cellular network 164, and exercise control over granting whether the UE 102 can connect to the ePDG 116. If the first cellular network 162 grants such ePDG connectivity, the UE 102 subsequently connects to the second cellular network 164 (via the ePDG 116 of the second CN 114) through a connection that traverses the first cellular network 162 to access IP services offered by the second CN 114.

In some implementations, the UE 102 can optionally provide to the first CN 112 (e.g., MME 115, PCRF 121) QoS requirements of the IP services intended to be established with the ePDG 116. For example, the UE 102 can include a QoS profile (e.g., standardized 5QI value(s) or QCI value(s)) of the intended IP service(s), or an identification of the intended IP service(s) in the request at event 314B.

In response to receiving the request, the first CN 112 (e.g., MME 115) transmits 316B a response (e.g., Tracking Area Update Accept message) to the MM controller 204 of the UE 102 via the cell 120. The response can include information to instruct the UE 102 to either establish a new packet data network (PDN) connection associated with a protocol for exchanging data packets between the UE 102 and the second cellular network 164 via the ePDG 116, or to use an existing PDN connection associated with a protocol for exchanging data packets between the UE 102 and the second cellular network 164 via the ePDG 116. For example, if the first CN 112 determines that an existing PDN connection between the second cellular network 164 and the UE 102 is sufficient to handle the QoS requirements of the IP services requested by the UE 102, the first CN 112 may include an indication in the Tracking Area Update Accept message to instruct the UE 102 to reuse the existing PDN connection. Otherwise, the first CN 112 may include an indication in the Tracking Area Update Accept message to instruct the UE 102 to request a new PDN connection, or to modify the existing PDN connection.

In some implementations, if the UE 102 provides the first CN 112 with QoS requirements of the IP services intended to be established with the ePDG 116 discussed above, either the UE 102 or the first cellular network 162 can initiate a PDN connection (either a modified existing PDN connection or a new PDN connection) with parameters that satisfy the QoS requirements. In this way, the quality of the connection that traverses the first cellular network 162 and the second cellular network 164 via the ePDG 116 is bolstered in accordance with the QoS requirements, so that IP services, such as IMS voice that typically has stringent QoS requirements, is properly supported over the connection. In some implementations, the first cellular network 162 can initiate the PDN connection with QoS requirements based on an SLA between the PLMN 161 and the PLMN 163, which may be the same or differ from the QoS requirements of the IP services intended to be accessed by the UE 102.

To modify an existing PDN connection between the UE 102 and the second cellular network 164 via the ePDG 116, the UE 102 (e.g., SM controller 208) or the first CN 112 (e.g., MME 115, PCRF 121) can initiate 318B a bearer resource modification procedure pursuant to 3GPP TS 24.301 to support the IP services to be delivered via ePDG 116. To established a new PDN connection, the UE 102 (e.g., SM controller 208) can initiate 320B a bearer resource allocation procedure pursuant to 3GPP TS 24.301 to establish a new PDN connection with the first CN 112 (e.g., MME 115, PCRF 121). In some implementations, in either of these procedures, the UE 102 (e.g., SM controller 208) can transmit a request message (e.g., Bearer Resource Modification Request message, Bearer Resource Allocation Request message) to the first CN 112, which in turn modifies or otherwise establishes resources requested by the UE 102. More generally, either procedure can include any suitable messaging and processing at the UE 102 and/or the first CN 112 that causes the first CN 112 to establish a PDN connection over ePDG 116 that satisfies QoS requirements for IP services accessible by the UE 102. The base station 104 then can transmit an RRC Configuration message configuring a DRB for the PDN connection to the UE 102.

After successfully performing the bearer resource establishment procedure and/or bearer resource modification procedure, the UE 102 establishes 322B connectivity with the ePDG 116 of the second CN 114 via 3GPP access of the first CN 112. As a result, the base station 104 can generate a DRB configuration configuring DRB(s) and configure radio resources so that the UE 102 can transmit and receive packets of an IMS call (e.g., via Internet application 222). After configuring the radio resources, the UE 102 (e.g., IMS controller 206) can transmit IMS signaling messages (e.g., SIP messages) with the IMS 152 (e.g., P-CSCF 118) via the second CN 114 using the established PDN connection, and receive the SIP "200 OK" message from the IMS 152 in response, thereby establishing an IMS call via the base station 104.

Although FIGS. 3A and 3B each depict CN 112 and CN 114 as the same type of core network (i.e., 5GC and EPC, respectively), the CN 112 and CN 114 need not be the same type. For example, in a scenario similar to scenario 300A and 300B, CN 112 can be a 5GC, and CN 114 can be an EPC, or alternatively, CN 112 can be an EPC, and CN 114 can be a 5GC.

Figure 4:
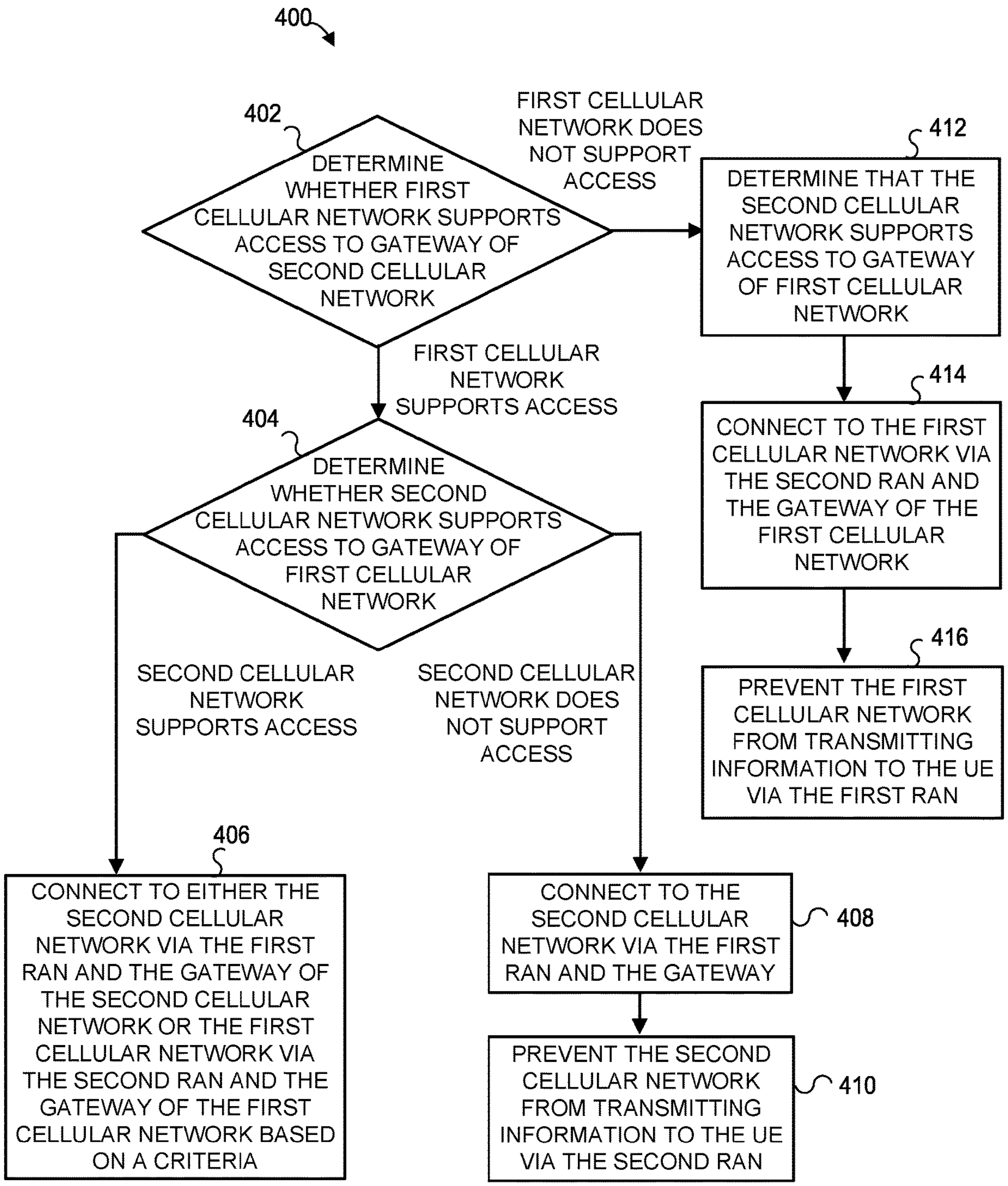
FIG. 4 is a flow diagram depicting an example method in the UE of FIG. 1 for connecting to a cellular network via its gateway and a RAN of another cellular network.

FIG. 4 is a flow diagram depicting an example method 400 in the UE (e.g., UE 102) for connecting to a second cellular network (e.g., second cellular network 164) via its gateway (e.g., ePDG 116) and a first RAN (e.g., base station 104) of a first cellular network (e.g., first cellular network 162), without connecting to the second cellular network over a second RAN (e.g., base station 106) of the second cellular network.

At block 402, a UE determines whether the first cellular network supports access to a gateway of the second cellular network (e.g., in any one of events 302A, 302B, 304A, 304B). The UE can query the first cellular network to make such a determination, or receive an indication whether the first cellular network supports access to the gateway of the second cellular network in an SIB, for example. If at block 402 the UE determines that the first cellular network supports the access to the gateway of the second cellular network, the UE at block 404 can also determine whether the second cellular network supports access to a gateway of the first cellular network (e.g., in any one of events 306A, 306B, 308A, 308B). The UE can similarly query the second cellular network to make such a determination, or receive an indication whether the second cellular network supports access to the gateway of the first cellular network in an SIB, for example.

If at block 404 the UE determines that the second cellular network also supports access to the gateway of the first cellular network, the UE at block 406 can connect to either the second cellular network via the first RAN of the first cellular network and the gateway of the second cellular network, or the first cellular network via the second RAN and the gateway of the first cellular network based on a criteria. For example, the UE can perform measurements to obtain a RSRP or RSRQ between the UE and each of the first RAN and the second RAN, and select the cellular network corresponding to the RAN that exhibits a higher RSRP or RSRQ. However, if at block 404 the UE determines that the second cellular network does not support access to the gateway of the first cellular network, the UE at block 408 can connect to the second cellular network via the first RAN and the gateway of the second cellular network (e.g., in any one of events 322A, 322B). The connection to the second cellular network can satisfy QoS requirements associated with the services offered by the second cellular network, so that services that have stringing QoS requirements, such as IMS voice, can be supported over the connection. The UE at block 410 can also prevent the second cellular network from transmitting information to the UE via the second RAN (e.g., in any one of events 312A, 312B). In this way, the UE can prevent the second cellular network from unnecessarily expending resources to page the UE via the second RAN, or otherwise incorrectly determining that the UE is unreachable, for example.

If at block 402 the UE determines that the first cellular network does not support the access to the gateway of the second cellular network, the UE at block 412 may determine whether the second cellular network supports access to a gateway of the first cellular network, e.g., by querying the second cellular network or receiving an indication, from the second cellular network, whether the second cellular network supports access to a gateway of the first cellular network. When the UE determines that the second cellular network supports access to the gateway of the first cellular network, the UE at block 414 can connect to the first cellular network via the second RAN and the gateway of the first cellular network, similar to the manner in which the UE at block 408 can connect to the second cellular network. The UE at block 416 can also prevent the first cellular network from transmitting information to the UE via the first RAN, similar to the manner in which the UE at block 410 prevents the second cellular network from transmitting information to the UE via the second RAN.

Figure 5:
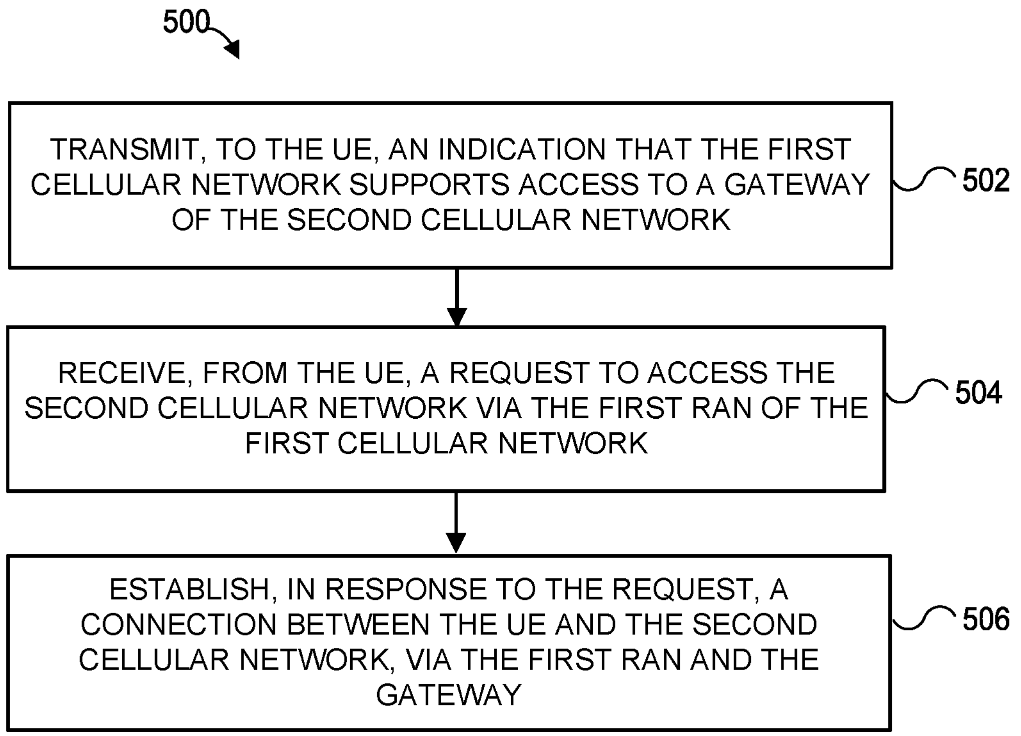
FIG. 5 is a flow diagram depicting an example method in a cellular network for providing communication to the UE of FIG. 1.

FIG. 5 is a flow diagram depicting an example method 500 in a first cellular network (e.g., first cellular network 162) including a first RAN (e.g., base station 104) for providing communication to a UE (e.g., UE 102).

At block 502, a first cellular network transmits, to the UE, an indication that the first cellular network supports access to a gateway of a second cellular network, such as second cellular network 164 (e.g., in any one of events 304A, 304B).

At block 504, the first cellular network receives, from the UE, a request to access the second cellular network via the first RAN of the first cellular network (e.g., in any one of events 314A, 314B). In this way, the first cellular network can be put on notice that the UE is requesting to connect to the second cellular network, and exercise control over granting whether the UE can connect to the gateway of the second cellular network.

At block 506, in response to the message, the first cellular network establishes, in response to the request, a connection between the UE and the second cellular network, via the first RAN and the gateway (e.g., in any one of events 322A, 322B).

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for support packet-based voice and video calls through the disclosed principles herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

The following list of aspects reflects a variety of the embodiments explicitly contemplated by the present disclosure.

Example 1. A method in a user device (UE) equipped with a first universal subscriber identity module (USIM) for communicating with a first cellular network and a second USIM for communicating with a second cellular network, wherein the first cellular network includes a first radio access network (RAN) and the second cellular network includes a second RAN, the method comprising: determining, by processing hardware of the UE, whether the first cellular network supports access to a gateway of the second cellular network; when the first cellular network supports the access: connecting to the second cellular network via the first RAN and the gateway; and preventing the second cellular network from transmitting information to the UE via the second RAN.

Example 2. The method of example 1, wherein the determining includes: receiving, from the first cellular network, an indication of whether the first cellular network supports access to the gateway of the second cellular network.

Example 3. The method of example 2, wherein the indication is broadcast in a system information block (SIB).

Example 4. The method of example 1, wherein the determining includes: transmitting, by the processing hardware, a query to the first cellular network or the second cellular network; and receiving an indication that the first cellular network supports access to the gateway in response to the query.

Example 5. The method of example 1, wherein the determining includes: receiving, from the first cellular network during a registration procedure, an indication of whether the first cellular network supports access to the gateway of the second cellular network.

Example 6. The method of example 1, further comprising: receiving, from the first cellular network, an indication of one or more public land mobile networks (PLMNs) the first cellular network can access via a respective gateway; wherein the determining is based at least in part on whether the second cellular network is associated with the one or more PLMNs.

Example 7. The method of example 6, wherein the received indication specifies only a PLMN of the first cellular network.

Example 8. The method of example 6, wherein the received indication specifies one or more equivalent PLMNs (E-PLMNs).

Example 9. The method of example 6, wherein the received indication specifies all PLMNs.

Example 10. The method of example 6, wherein the received indication includes a list of two or more PLMNs.

Example 11. The method of any one of examples 1-10, wherein the connecting to the second cellular network includes: transmitting, by the processing hardware via the first RAN, a request to access the gateway of the second cellular network.

Example 12. The method of example 11, wherein the request includes a quality of service (QoS) requirement for a data connection to the second cellular network.

Example 13. The method of example 11 or 12, wherein the request specifies one or more services for which the UE intends to use a data connection to the second cellular network.

Example 14. The method of any one of examples 11-13, wherein transmitting the request includes: transmitting the request in a message associated with mobility management at a non-access stratum (NAS) layer.

Example 15. The method of any one of the preceding examples, wherein the connecting includes: establishing a new session associated with a protocol for exchanging data packets, with the second cellular network via the gateway.

Example 16. The method of any one of examples 1-14, wherein the connecting includes: modifying an existing session associated with a protocol for exchanging data packets, with the second cellular network via the gateway.

Example 17. The method of example 15 or 16, wherein the establishing or modifying is in response to an instruction received via the first RAN.

Example 18. The method of any one of examples 1-17, further comprising: determining, by processing hardware of the UE, that the second cellular network supports access to a gateway of the first cellular network; and selecting, based on one or more criteria, between connecting to the second cellular network via the first RAN and connecting to the first cellular network via the second RAN.

Example 19. The method of example 18, wherein the one or more criteria include respective signal metrics for the first RAN and the second RAN.

Example 20. The method of example 19, wherein the respective signal metrics include signal strength measurements.

Example 21. The method of example 18, wherein the one or more criteria include a preference of the UE.

Example 22. The method of any one of the preceding examples, wherein the preventing includes: deregistering from the second RAN of the second cellular network.

Example 23. The method of any one of examples 1-21, wherein the preventing includes: activating a Mobile Initiated Connection Only (MICO) mode with the second RAN of the second cellular network.

Example 24. A user equipment (UE) comprising processing hardware configured to implement a method of any one of examples 1-23.

Example 25. A method in a first cellular network including a first RAN for providing communication to a UE, the method comprising: transmitting, by processing hardware to the UE, an indication that the first cellular network supports access to a gateway of a second cellular network; receiving, by the processing hardware from the UE, a request to access the second cellular network via the first RAN of the first cellular network; and establishing, by the processing hardware and in response to the request, a connection between the UE and the second cellular network, via the first RAN and the gateway.

Example 26. The method of example 25, wherein the transmitting includes: broadcasting the indication via the first RAN.

Example 27. The method of example 26, wherein the indication is broadcast in an SIB.

Example 28. The method of example 25, wherein the transmitting includes: transmitting the indication during a registration procedure.

Example 29. The method of example 28, wherein the indication is included in a message indicating that a request of the UE to register with the first cellular network has been granted.

Example 30. The method of example 28, wherein the indication specifies one or more PLMNs the first cellular network can access via a respective gateway.

Example 31. The method of example 30, wherein the indication specifies only a PLMN of the first cellular network.

Example 32. The method of example 30, wherein the indication specifies one or more E-PLMNs.

Example 33. The method of example 30, wherein the indication specifies all PLMNs.

Example 34. The method of example 30, wherein the indication includes a list of two or more PLMNs.

Example 35. The method of any one of examples 25-34, wherein the request includes a QoS requirement for the connection to the second cellular network.

Example 36. The method of any one of examples 25-35, wherein the request specifies one or more services for which the UE intends to use the connection to the second cellular network.

Example 37. The method of example 35 or 36, wherein receiving the request includes: receiving the request in a message associated with mobility management at a NAS layer.

Example 38. The method of any one of examples 25-37, wherein the establishing includes: establishing a new session associated with a protocol for exchanging data packets, with the second cellular network via the gateway.

Example 39. The method of any one of examples 25-37, wherein the establishing includes: modifying an existing session associated with a protocol for exchanging data packets, with the second cellular network via the gateway.

Example 40. A cellular network comprising processing hardware configured to implement a method of any one of examples 25-39.

What is claimed is:

1. A method in a user device (UE) equipped with a first universal subscriber identity module (USIM) for communicating with a first cellular network and a second USIM for communicating with a second cellular network, the first cellular network includes a first radio access network (RAN) and the second cellular network includes a second RAN, the method comprising:

determining that the first cellular network supports access to a gateway of the second cellular network and that access to a gateway of the first cellular network is unsupported by the second cellular network; and following the determining:

connecting to the second cellular network via the first RAN and the gateway of the second cellular network; and preventing the second cellular network from transmitting information to the UE via the second RAN.

2. The method of claim 1, wherein the determining includes one of:

receiving, from the first cellular network, an indication of whether the first cellular network supports access to the gateway of the second cellular network;

transmitting a query to the first cellular network or the second cellular network; and receiving an indication that the first cellular network supports access to the gateway of the second cellular network in response to the query; or receiving, from the first cellular network during a registration procedure, an indication of whether the first cellular network supports access to the gateway of the second cellular network.

3. The method of claim 1, further comprising:

receiving, from the first cellular network, an indication of one or more public land mobile networks (PLMNs) the first cellular network can access via a respective gateway associated with the second cellular network;

wherein the determining is based at least in part on whether the second cellular network is associated with the one or more PLMNs.

4. The method of claim 3, wherein the received indication specifies one of:

only a PLMN of the first cellular network;

one or more equivalent PLMNs (E-PLMNs);

all PLMNs; and a list of two or more PLMNs.

5. The method of claim 1, wherein the connecting to the second cellular network includes:

transmitting, via the first RAN, a request to access the gateway of the second cellular network.

6. The method of claim 5, wherein the request includes a quality of service (QoS) requirement for a data connection to the second cellular network.

7. The method of claim 5, wherein the request specifies one or more services for which the UE intends to use a data connection to the second cellular network.

8. The method of claim 5, wherein transmitting the request includes:

transmitting the request in a message associated with mobility management at a non-access stratum (NAS) layer.

9. The method of claim 1, wherein the connecting includes one of:

establishing a new session associated with a protocol for exchanging data packets, with the second cellular network via the gateway of the second cellular network; or modifying an existing session associated with a protocol for exchanging data packets, with the second cellular network via the gateway of the second cellular network.

10. The method of claim 1, wherein the preventing includes one of:

deregistering from the second RAN of the second cellular network; or activating a Mobile Initiated Connection Only (MICO) mode with the second RAN of the second cellular network.

11. A method in a first cellular network including a first radio access network (RAN) for providing communication to a UE, the method comprising:

transmitting to the UE an indication that the first cellular network supports access to a gateway of a second cellular network including a second RAN;

receiving, from the UE, a request to access the second cellular network via the first RAN of the first cellular network based on access to the gateway of the first cellular network being unsupported by the second cellular network;

establishing, in response to the request, a connection between the UE and the second cellular network, via the first RAN and the gateway of the second cellular network, causing the UE to connect to the second cellular network via the first RAN and the gateway of the second cellular network; and preventing the second cellular network from transmitting information to the UE via the second RAN.

12. An apparatus for wireless communication at a user device (UE) equipped with a first universal subscriber identity module (USIM) for communication with a first cellular network and a second USIM for communication with a second cellular network, the first cellular network includes a first radio access network (RAN) and the second cellular network includes a second RAN, comprising:

a memory; and processing hardware coupled to the memory and configured to:

determine that the first cellular network supports access to a gateway of the second cellular network and that access to a gateway of the first cellular network is unsupported by the second cellular network;

connect to the second cellular network via the first RAN and the gateway of the second cellular network; and prevent the second cellular network from transmitting information to the UE via the second RAN.

13. The apparatus of claim 12, wherein the processing hardware is further configured to:

receive, from the first cellular network, an indication of whether the first cellular network supports access to the gateway of the second cellular network;

transmit a query to the first cellular network or the second cellular network; and receiving an indication that the first cellular network supports access to the gateway of the second cellular network in response to the query; or receive, from the first cellular network during a registration procedure, an indication of whether the first cellular network supports access to the gateway of the second cellular network.

14. The apparatus of claim 12, wherein the processing hardware is further configured to:

receive, from the first cellular network, an indication of one or more public land mobile networks (PLMNs) the first cellular network can access via a respective gateway associated with the second cellular network;

wherein the determination is based at least in part on whether the second cellular network is associated with the one or more PLMNs.

15. The apparatus of claim 14, wherein the received indication specifies one of:

only a PLMN of the first cellular network;

one or more equivalent PLMNs (E-PLMNs);

all PLMNs; and a list of two or more PLMNs.

16. The apparatus of claim 12, wherein to connect to the second cellular network the processing hardware is further configured to:

transmit, via the first RAN, a request to access the gateway of the second cellular network.

17. The apparatus of claim 12, wherein to prevent the second cellular network from transmitting information to the UE via the second RAN the processing hardware is configured to:

deregister from the second RAN of the second cellular network.

18. The apparatus of claim 12, wherein to prevent the second cellular network from transmitting information to the UE via the second RAN the processing device is configured to:

activate a Mobile Initiated Connection Only (MICO) mode with the second RAN of the second cellular network.

19. The apparatus of claim 12, wherein to connect to the second cellular network via the first RAN and the gateway of the second cellular network the processing hardware is configured to:

establish a new session associated with a protocol for exchanging data packets, with the second cellular network via the gateway of the second cellular network.

20. The apparatus of claim 12, wherein to connect to the second cellular network via the first RAN and the gateway of the second cellular network the processing hardware is configured to:

modify an existing session associated with a protocol for exchanging data packets, with the second cellular network via the gateway of the second cellular network.

* * * * *